United States Patent
Hoffmann (12)

(10) Patent No.: US 9,561,143 B2
(45) Date of Patent: Feb. 7, 2017

(54) POWER DRIVEN VEHICLE HAVING A TAKE-APART FRAME

(71) Applicant: Invacare International Sarl, Gland (CH)

(72) Inventor: Dirk Hoffmann, Garbsen (DE)

(73) Assignee: Invacare International Sarl, Gland (CH)

( * ) Notice: Subject to any disclaimer, the term of this patent is extended or adjusted under 35 U.S.C. 154(b) by 69 days.

(21) Appl. No.: 14/717,006

(22) Filed: May 20, 2015

(65) Prior Publication Data

US 2015/0250666 A1    Sep. 10, 2015

Related U.S. Application Data

(63) Continuation-in-part of application No. PCT/IB2012/056872, filed on Nov. 30, 2012.

(51) Int. Cl.
*A61G 5/04* (2013.01)
*B62K 15/00* (2006.01)
(Continued)

(52) U.S. Cl.
CPC ............. *A61G 5/045* (2013.01); *B62D 21/12* (2013.01); *B62D 39/00* (2013.01); *B62D 61/12* (2013.01);
(Continued)

(58) Field of Classification Search
CPC ............ A61G 5/04; A61G 5/045; A61G 5/08; A61G 5/10; A61G 2005/0883; B62D 21/12; B62D 39/00; B62D 61/08; B62D 63/025; B62K 5/025; B62K 5/023; B62K 5/06; B62K 15/00; B62K 2015/001; B62K 2015/005
See application file for complete search history.

(56) References Cited

U.S. PATENT DOCUMENTS 3,952,822 A * 4/1976 Udden ............... A61G 5/045
                                              180/209
4,633,962 A * 1/1987 Cox .................. A61G 5/045
                                              180/329
(Continued)

OTHER PUBLICATIONS

International Search Report and Written Opinion from PCT/IB2012/056872 dated Aug. 26, 2013.

*Primary Examiner* — Barry Gooden, Jr.
(74) *Attorney, Agent, or Firm* — Calfee, Halter & Griswold LLP (57) ABSTRACT

An exemplary power driven vehicle has a take-apart frame comprising a front frame and a rear frame that are detachably and pivotally connected together. The front frame includes means for receiving at least one steerable wheel and a steering mechanism and means for receiving a seat, and the rear frame includes means for receiving at least two drive wheels. The vehicle also has at least one steerable wheel, a steering mechanism, and a seat connected to said front frame. At least two drive wheels are pivotally connected to said rear frame via a single axle. An electric motor is mounted on the rear frame and adapted to drive at least one of the drive wheels. A shroud partially covers the front frame and is fixedly connected thereto. At least one battery box is detachably mounted on the shroud and is in electrical communication with the electric motor. A locking and unlocking means of the vehicle is adapted to prevent, or alternatively allow, the disconnection of the rear frame from the front frame. The locking and unlocking means comprises a locking lever pivotally connected to the front frame. At least one groove or recess in the locking means engages the rear frame when the vehicle is in its normal position, thus preventing the rear frame from pivoting relative to the front frame. In an unlocking position the rear frame is allowed to (Continued)

pivot relative to the front frame, thereby allowing the rear from to be disconnected from the front frame.

21 Claims, 8 Drawing Sheets

(51) Int. Cl.
    *B62K 5/025*     (2013.01)
    *B62D 21/12*     (2006.01)
    *B62D 39/00*     (2006.01)
    *B62D 61/12*     (2006.01)
    *B62D 63/02*     (2006.01)
    *A61G 5/10*     (2006.01)

(52) U.S. Cl.
    CPC ............ *B62D 63/025* (2013.01); *B62K 5/025* (2013.01); *B62K 15/00* (2013.01); *A61G 2005/1051* (2013.01); *A61G 2005/1086* (2013.01)

(56) References Cited

U.S. PATENT DOCUMENTS

| | | | |
|---|---|---|---|
| 4,944,359 A | 7/1990 | Doman et al. | |
| 5,074,372 A | 12/1991 | Schepis | |
| 5,121,806 A * | 6/1992 | Johnson ................ | B60K 1/04 180/65.51 |
| 5,150,762 A * | 9/1992 | Stegeman ............... | B60K 1/00 180/208 |
| 5,322,140 A * | 6/1994 | Bussinger .............. | A61G 5/04 180/402 |
| 6,050,593 A * | 4/2000 | McConnell ............ | B62D 1/14 280/287 |
| 6,176,337 B1 * | 1/2001 | McConnell ............ | B62D 1/14 180/208 |
| 6,378,642 B1 * | 4/2002 | Sutton .................... | B62D 61/08 180/208 |
| 6,439,331 B1 * | 8/2002 | Fan ....................... | B62D 21/12 180/208 |
| 6,979,229 B1 * | 12/2005 | Liao ....................... | B62K 5/025 439/660 |
| 7,044,249 B2 * | 5/2006 | Fan ........................ | B60D 1/00 180/208 |
| 7,234,557 B2 * | 6/2007 | Chen ..................... | B62K 5/025 180/208 |
| 7,252,168 B2 * | 8/2007 | Lin ....................... | B62D 63/025 180/208 |
| 7,401,675 B2 * | 7/2008 | Chang ................... | B62K 5/027 180/208 |
| 9,440,690 B2 * | 9/2016 | Manternach ........... | B62K 5/007 |
| 2003/0192726 A1 * | 10/2003 | Chu ....................... | B60K 1/00 180/65.51 |
| 2004/0144589 A1 * | 7/2004 | Chen ..................... | B62D 21/12 180/311 |
| 2005/0139410 A1 * | 6/2005 | Fan ........................ | B60D 1/00 180/311 |
| 2005/0224275 A1 * | 10/2005 | Lin ........................ | B62D 21/12 180/311 |
| 2006/0086553 A1 * | 4/2006 | Chen ..................... | B62K 5/025 180/208 |
| 2006/0260852 A1 * | 11/2006 | Wu ........................ | B62K 5/007 180/65.1 |
| 2007/0051548 A1 * | 3/2007 | Kosco ................... | B62K 5/025 180/208 |
| 2007/0063504 A1 * | 3/2007 | Hsiao .................... | B62K 5/025 280/781 |
| 2007/0084656 A1 | 4/2007 | Chang | |
| 2007/0125583 A1 | 6/2007 | Fan | |
| 2009/0020350 A1 * | 1/2009 | Wu ....................... | B62K 15/008 180/208 |
| 2010/0084831 A1 * | 4/2010 | Wang .................... | A61G 5/04 280/39 |
| 2015/0137481 A1 * | 5/2015 | Manternach ........... | B62K 5/007 280/400 |
| 2015/0209205 A1 * | 7/2015 | Ransenberg ......... | B62K 15/008 280/641 |
| 2016/0023708 A1 * | 1/2016 | Neerman ................ | B62J 1/08 280/202 |
| 2016/0221450 A1 * | 8/2016 | Lee ........................ | B60L 11/18 |

* cited by examiner

POWER DRIVEN VEHICLE HAVING A TAKE-APART FRAME

RELATED APPLICATIONS

The present application is a continuation-in-part of PCT/IB2012/056872, filed on Nov. 30, 2012, the entire disclosure of which is fully incorporated herein by reference.

TECHNICAL FIELD

The present invention relates in general to power driven vehicles used by at least partially disabled persons for mobility. In particular, the invention relates to scooters used by at least partially disabled persons for mobility having a two-part take-apart frame. However, it will be appreciated that the invention has broader applications and may be advantageously employed in other environments and applications.

BACKGROUND

Three-wheeled or four-wheeled scooters used by partially disabled persons are well known in the art. Generally, these scooters include two rear wheels and a third wheel disposed at the front of the vehicle. In some designs, the front wheel is power driven while in other designs the rear wheels are power driven. Typically, the driven wheel(s) are powered by one or more batteries and are carried by the scooter. The batteries are rechargeable and provide a cost efficient manner of powering the vehicles.

The front wheel is usually steered by a tiller or conventional steering assembly. Means for controlling the motor are mounted on the steering assembly within easy reach of the vehicle operator. Preferably, the seat and steering assembly are adjustable to accommodate different size people and to facilitate ease of storage and transport.

To further facilitate the transfer of such vehicles in an automobile van or in some other mariner to the site of operation of the personal mobility vehicle, it has been proposed to construct such vehicles so that they may be disassembled into several components. In particular, it has been proposed to provide the scooter with a two-part frame assembly. It was further contemplated that such personal vehicles would be capable of disassembly and assembly by users who have some physical disability but are sufficiently physically active to assemble or disassemble the components of a personal vehicle. However, in many cases the mechanism used in conventional scooters for assembling and disassembling their different components, and in particular the two parts of their frame, are relatively complex and complicated to handle. Generally, this assembling or disassembling operation involves many successive steps during which the user is often compelled to use both of its hands at the same time. Furthermore, in such conventional scooters, it is often difficult to know if the two-part frame assembly is correctly and safely assembled.

SUMMARY

Exemplary embodiments of scooters having a two-part take-apart frame are disclosed herein.

In one exemplary embodiment, a power driven vehicle used by at least partially disabled persons for mobility having a take-apart frame comprises a frame having a front frame and a rear frame that are detachably and pivotally connected together. The front frame includes means for receiving at least one steerable wheel and a steering mechanism and means for receiving a seat, and the rear frame includes means for receiving at least two drive wheels. The vehicle also has at least one steerable wheel, a steering mechanism, and a seat connected to said front frame. At least two drive wheels are pivotally connected to said rear frame via a single axle. An electric motor is mounted on the rear frame and adapted to drive at least one of the drive wheels. A shroud partially covers the front frame and is fixedly connected thereto. At least one battery box is detachably mounted on the shroud and is in electrical communication with the electric motor. A locking and unlocking means of the vehicle is adapted to prevent, or alternatively allow, the disconnection of the rear frame from the front frame. The locking and unlocking means comprises a locking lever pivotally connected to the front frame. At least one groove or recess in the locking means engages the rear frame when the vehicle is in its normal position, thus preventing the rear frame from pivoting relative to the front frame. In an unlocking position the rear frame is allowed to pivot relative to the front frame, thereby allowing the rear from to be disconnected from the front frame.

BRIEF DESCRIPTION OF THE DRAWINGS

These and other features and advantages of the present invention will become better understood with regard to the following description and accompanying drawings in which.

DETAILED DESCRIPTION

For the purpose of the present application, situations and directions of elements of the vehicle of the present invention are determined by the perspective of a user seated in the vehicle. Accordingly, the rear side of the vehicle corresponds to the left side of FIG. 1. The situations or directions "up" or "top" and "down" or "bottom", "rear" or "back" and "front", "behind" and "in front", "upper" and "lower", "lateral" and "central" follow the same rule. A longitudinal direction corresponds to a back-to-front direction and a lateral direction corresponds to a left-to-right direction. The horizontal corresponds to the plane tangential to the rear and front wheels and positioned under said wheels when the vehicle is its normal position of use. A horizontal plane corresponds to a plane parallel to the horizontal. The vertical, or a vertical plane, corresponds to a plane perpendicular to the horizontal. In the following specification, the expressions "clockwise direction" and "anticlockwise direction" refer to a pivoting movement of the rear or front frame of the frame or any other parts of the vehicle when the vehicle is viewed on its right side.

Figure 1:
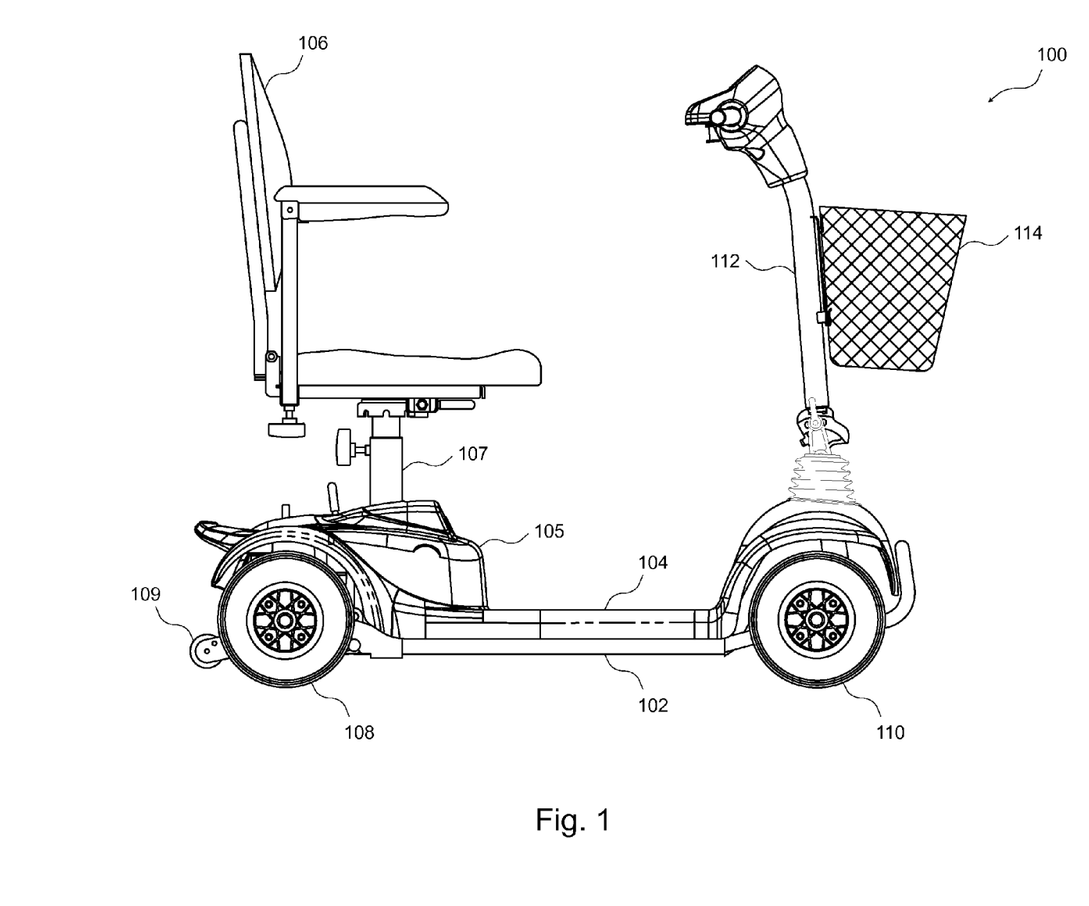
FIG. 1 is a side elevation view of a conventional scooter for partially disabled persons having a two-part frame assembly.

FIG. 1 shows a scooter for disabled persons according to the state of art. Such a scooter is marketed by the Applicant under the trade designation LYNX®. This scooter 100 has a steel frame 102 that is typically covered by a decorative shroud 104. The scooter 100 also includes a seat 106, drive wheels 108 and forward steering wheels 110. The seat 106 is removably connected to the frame 102 via a vertical tube 107. The drive wheels 108 can be linked to one or more electric motors (not shown) or electric motor/gear box combinations. Powering the motors is typically provided through use of one or more batteries contained in a battery box 105 removably connected to the shroud 104. The batteries may be conveniently recharged when the vehicle is not in use. Optional caster wheels 109 may also be pivotally connected at the rear end of the frame 102. Forward steering wheels 110 are physically linked to a steering column 112. Steering column 112 further has steering handles, an instrumentation display, a user input control device, such as, for example, a throttle or the like, and a basket support supporting a basket 114. The angle of the steering column 112 may be selectively adjusted. This permits the user to position the steering handles at a comfortable angle or permits to fold the steering column downward toward the frame for storage purposes.

Figure 2A:
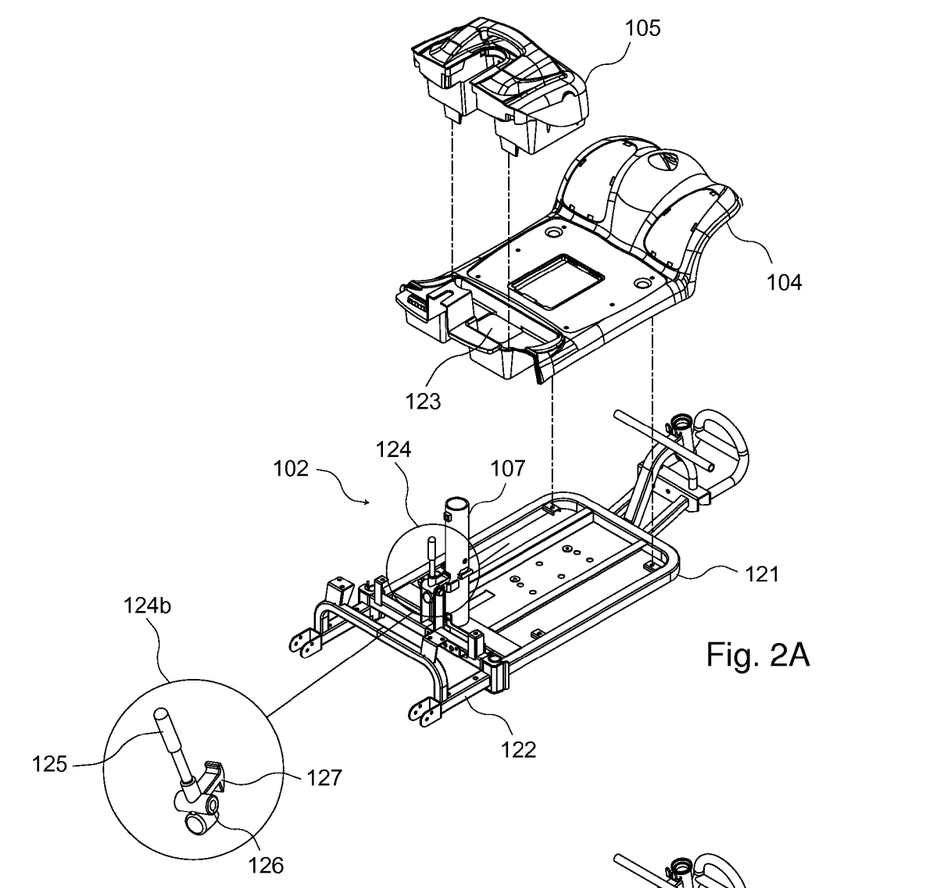
FIG. 2A is an exploded perspective view of the two-part frame assembly of the scooter of FIG. 1 in its assembled configuration.
Figure 2B:
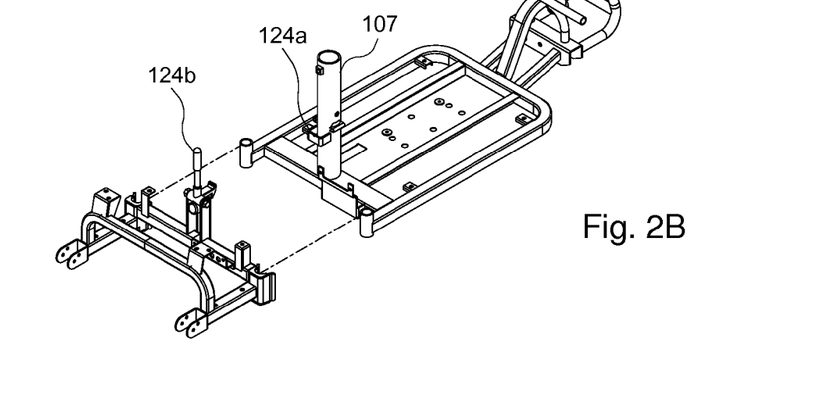
FIG. 2B is a view similar to FIG. 2A, but in its disassembled configuration.

With reference to FIGS. 2A and 2B, the frame 102 of the scooter 100 will be more particularly described. The frame 102 is comprised of two frame components, namely, a first or front frame 121 and a second or rear frame 122 which are detachably connected together by a two-part coupling 124. A first part 124a of the coupling 124 is rigidly mounted on the front frame 121 and a second part 124b of the coupling 124 is pivotally mounted on the rear frame 122. The second part 124b has been shown alone at an enlarged scale at the left side of FIG. 2A. Said second part 124b consists in a lever 125 integral with or fixedly connected to a hook 127 orthogonally oriented thereto and an axle tube 126 pivotally connected to the rear frame 122. In the assembled configuration of the frame illustrated in FIG. 2A, the lever 125 is vertically oriented and the hook 127 is received inside a U-shaped bracket 124a horizontally oriented and fixedly connected at its two ends to the vertical tube 107 so that the hook 127 abuts against this bracket 124a when the operator tries to move the rear frame 122 rearward relative to the front frame 121, as illustrated in FIG. 2B. Thus, in this vertical position of lever 125, the rear frame 122 can not be separated from the front frame 121. To permit the disassembling of the frame, the lever 125 has to be pulled backward so as to position the hook 127 above the bracket 124a, thus permitting the rearward movement of the rear frame 122 relative to the front frame 121. However, during this disassembling operation, the lever 125 has to be hold inclined backward. Thus, the user needs both hands for separating the frame 102. This is a first inconvenience of this type of coupling. A further inconvenience is the potential risk that the lever 125 is actuated by accident by the user itself or by a third party during the normal use of the scooter. In this case, a non-intentional disassembling of the frame could occur when the user is sitting inside the scooter, thus potentially resulting in serious consequences for the user.

FIG. 2A also illustrates the assembling operation of the shroud 104 and the battery box 105 to the frame 102. The shroud 104 at least partially covers the front frame 121 and is fixedly connected thereto by screwing means for example. The battery box 105 is received into a recess 123 of said shroud 104, a lower side of said battery box 105 and said recess 123 being shaped so as to fit into each other, thus preventing lateral and longitudinal movements of said battery box relative to the shroud, but permitting its upward movement relative to the shroud.

In an exemplary scooter for partially disabled persons of the present application, the frame has a two-part assembly with a mechanism that allows for easy assembly and disassembly of the frame with one hand, and wherein the number of steps involved during assembly or disassembly are reduced. An exemplary scooter for partially disabled persons of the present application, the user can easily know if the two-part frame is correctly and safely assembled.

Figure 3:
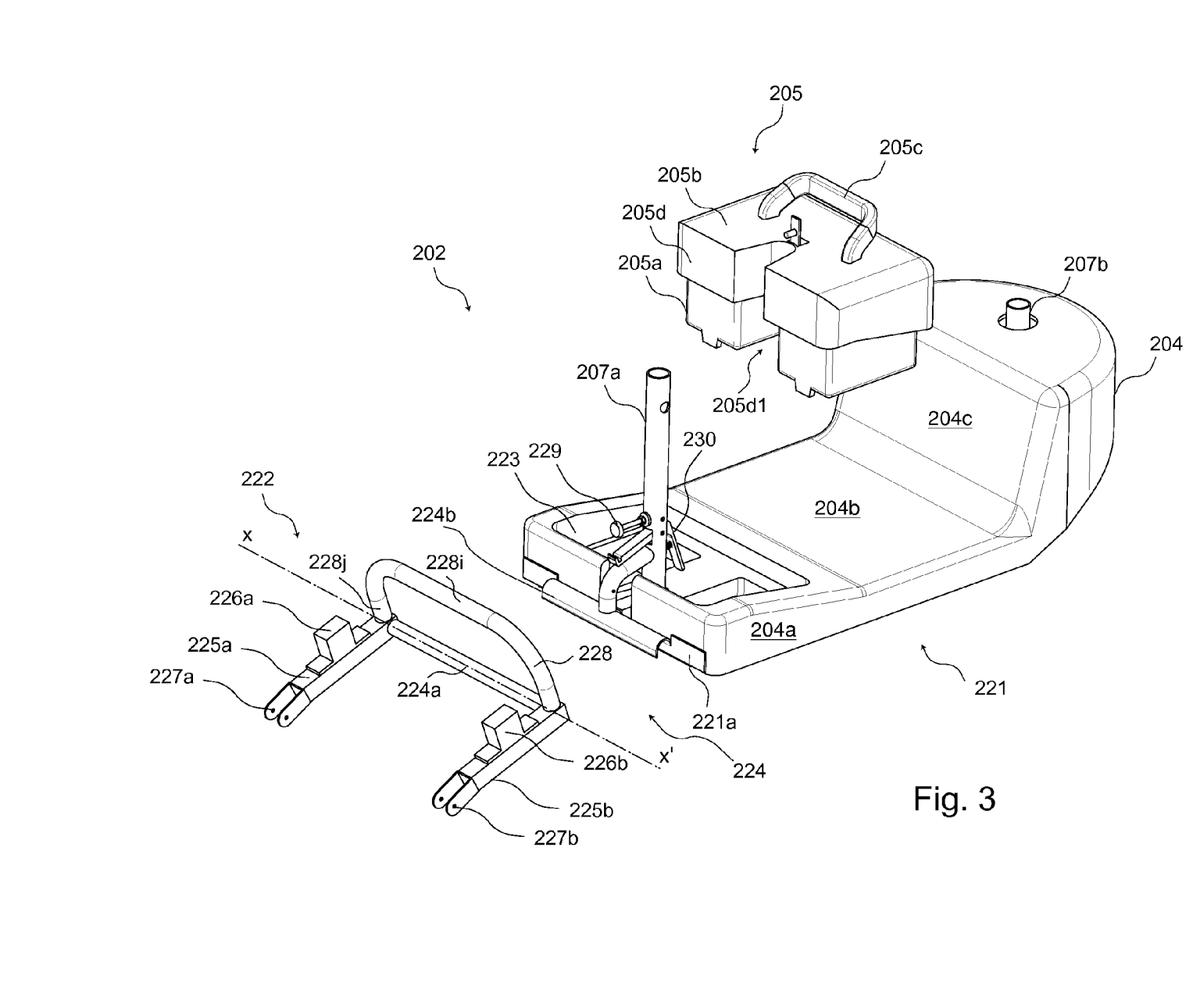
FIG. 3 is an exploded perspective view of the two-part frame assembly of a first embodiment of the vehicle according to the present invention in its disassembled configuration.

With reference to FIG. 3, an exemplary power driven vehicle is shown that has a two-part frame 202 that may replace the two-part frame 102 illustrated in FIGS. 2A and 2B in the scooter 100 of FIG. 1 or in a scooter relatively similar thereto. FIG. 3 corresponds to the disassembled configuration of the frame 202.

The two-part frame 202 includes two frame components, namely, a first or front frame 221 and a second or rear frame 222 which are detachably connected together by a two-part coupling 224. The front frame 221 is not visible in FIG. 3 due to the fact that it is almost entirely covered by a shroud 204. Two vertical tubes thereof, namely a left tube 207a and a right tube 207b, can nevertheless be seen through corresponding apertures of the shroud 204 provided respectively in a rear section 204a and a front section 204c thereof. These vertical tubes 207a, 207b are adapted to respectively support the seat and the steering column of the vehicle. The shroud 204 further includes a middle section 204b separating the rear section 204a from the front section 204c, said middle section 204b being adapted to support the user's feet when he is sitting inside the vehicle. The rear section 204a is provided with a recess 223 adapted to receive a battery box 205, a lower part 205a of said battery box 205 and said recess 223 being shaped so as to fit into each other, thus preventing lateral and longitudinal movements of said battery box 205 relative to the shroud 204, but permitting its upward movement relative to the shroud. An upper part 205b of the battery box 205 is advantageously provided with a handle 205c so as to facilitate the detachment of said battery box from the shroud and the handling of said battery box.

The rear frame 222 comprises two laterally spaced-apart, longitudinally extending arms 225a and 225b. Each arm 225a, 225b is provided with a drive wheel axle supporting member 226a, 226b, adapted to pivotally connect the axle of the drive wheels and with a castor wheel supporting member 227a, respectively 227b, adapted to pivotally connect the axle of a castor wheel (not shown). The rear frame 222 further comprises one U-shaped element 228 comprising a bottom member 228i connecting to the arms 225a and 225b via two lateral members 228j, said U-shaped element 228 being disposed over the tubular crosspiece 224a and substantially defining a plane orthogonal to said arms 225a, 225b. As better explained in the following paragraphs, the U-shaped element 228 abuts against a stop means 229 provided along the vertical tube 207a in the completely assembled configuration of the frame 202. In the embodiment shown, this stop means consists in a rubber reinforced screw head 229a (see FIG. 4a) of a screw 229, the threaded rod 229b (see FIG. 4A) of said screw 229 being fixedly connected to the vertical tube 207a (see FIG. 4A). In a further embodiment (not shown), the stop means may also consist in a screw head without rubber reinforcement.

The arms 225a, 225b are joined together at their front end by one laterally extending tubular crosspiece 224a to form one part of the coupling 224. The other part of the coupling consists in one hemi-cylindrical hook 224b provided at a rear end 221a of the front frame 221, said hook 224b being adapted so as to receive said crosspiece 224a and so as to permit both the pivoting movement of the front frame 221 relative to the rear frame 222 relative to a pivot axis XX' defined by the tubular crosspiece 224a and the upward movement of the front frame 221 relative to the rear frame 222, thus permitting the disassembling, and the assembling, of the two-part frame 202 from its completely assembled configuration, respectively its disassembled configuration.

So as to lock and unlock the rear frame 222 to the front frame 221 in the completely assembled configuration of the frame 202, an exemplary vehicle further comprises locking and unlocking means adapted to prevent, and conversely to permit, the disconnection of the rear frame from the front frame.

Figures 4, 4A:
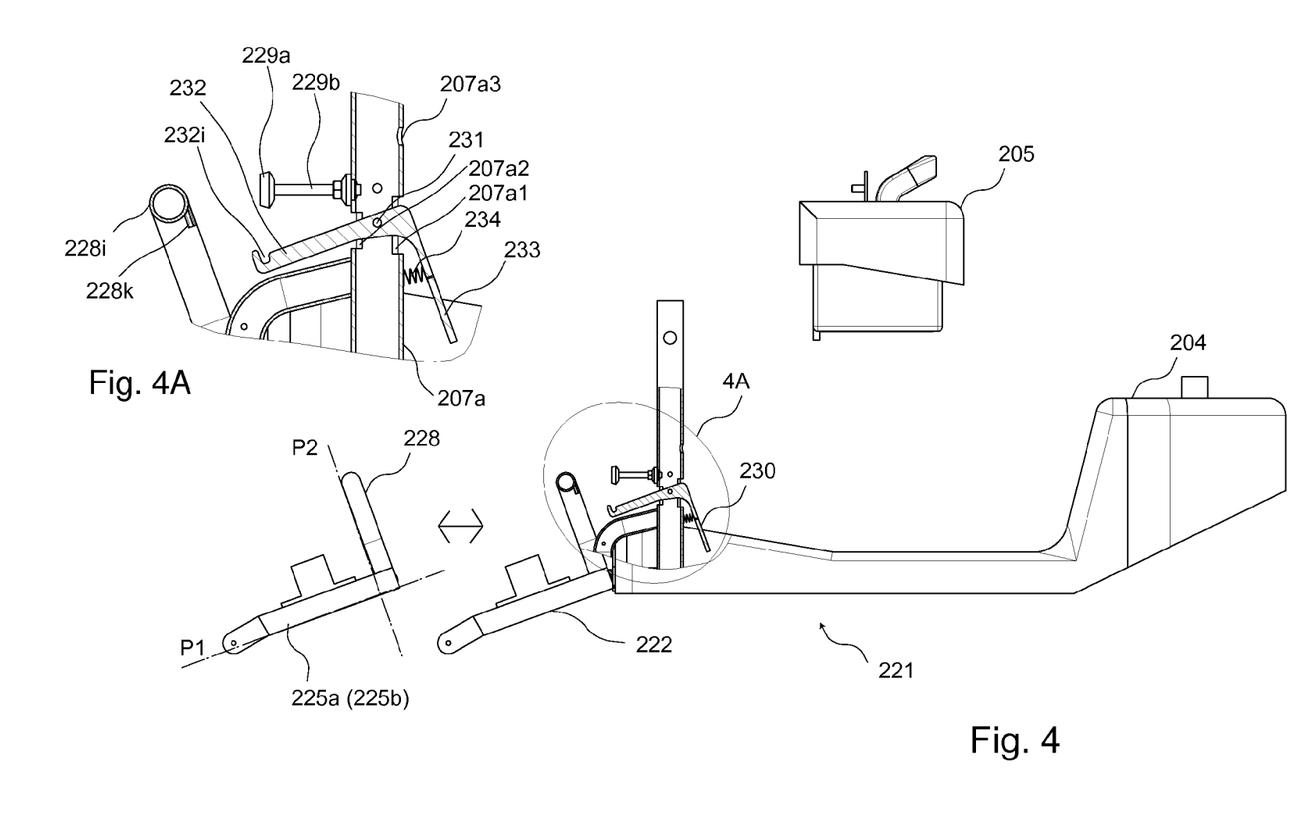
FIG. 4 is a side view of the two-part frame assembly of FIG. 3, but in a first one of its partially assembled configurations, an area 4A being partially cross-sectioned.
FIG. 4A is an enlarged view of the area 4A of FIG. 4.

In the embodiment shown in FIGS. 3 and 4, and in detail in FIG. 4A, this locking and unlocking means comprises an L-shaped locking lever 230 longitudinally extending through two diametrically through-holes 207a1 and 207a2 provided in the vertical tube 207a and pivotally connected thereto around a laterally aligned pivot axis 231. This locking lever 230 comprises one first member 232 and one second member 233 perpendicular or substantially perpendicular thereto. The first member 232 is provided with a groove 232i at its upper side, said groove 232i being adapted to at least partially receive a downward extending projection 228k provided along the bottom member 228i of the U-shaped element 228 when the front frame 221 and the rear frame 222 are pivotally connected together, the U-shaped element 228 abutting against the rubber reinforced screw head 229a, and when said first member 232 is horizontal or substantially horizontal, thereby preventing the pivoting and upward movement of the front frame 221 relative to the rear frame 222. This specific configuration is illustrated in FIGS. 6, 6A and corresponds to the locking position of the lever 230 and to the completely assembled configuration of the frame 202.

As illustrated in FIG. 4A, the lever 230 is in its unlocking position. In this position, the first member 232 is pivoted downward relative to the horizontal and the second member 233 is pivoted upward relative to the vertical. The lever 230 may advantageously be configured so as to automatically move from its locking position to its unlocking position under the effect of its weight. In particular, the position of the pivot axis 231 may be suitably chosen so as to be forwardly spaced-apart from the centre of mass of the lever 230. In addition to or in substitution to the above mentioned advantageous configuration, the lever may also move from its locking position to its unlocking position under the action of a resilient means. In the embodiment shown in FIG. 4A, this resilient means consists in a compression coil spring connected at one end to the second member 233 of the lever 230 and at the other end to the vertical tube 207a.

Figures 6, 6A:
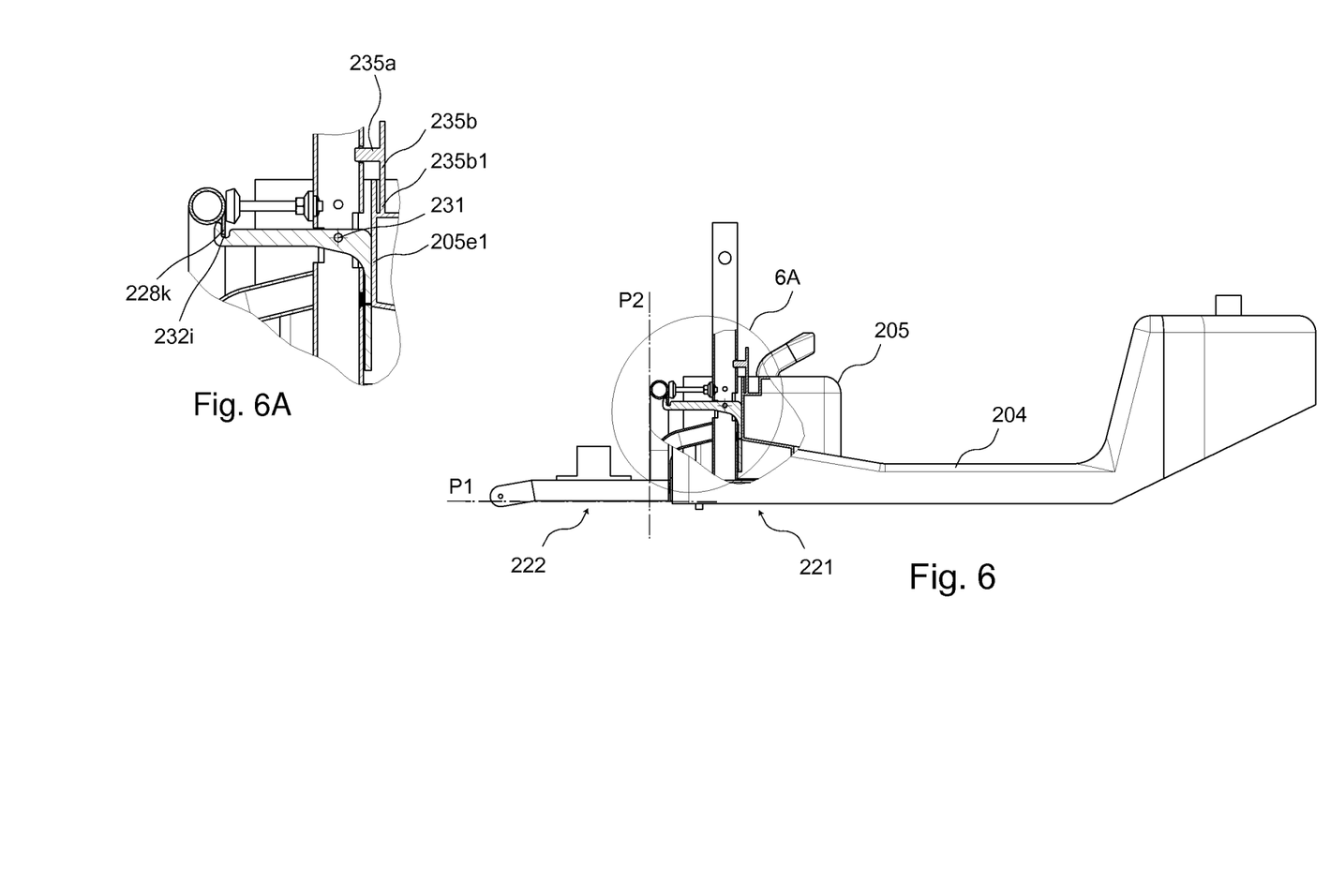
FIG. 6 is a view similar to FIG. 4, but in the completely assembled configuration of the two-part frame assembly.
FIG. 6A is an enlarged view of the area 6A of FIG. 6.

As illustrated in FIGS. 6 and 6A, the locking lever 230 moves from its unlocking position to its locking position under the action of the battery box 205. Indeed, as illustrated in FIG. 3, the rear side 205d of the battery box 205 is provided with a recess 205d1 extending from the upper side 205b thereof through its full height, said recess 205d1 being adapted to receive the vertical tube 207a when the battery box 205 is mounted inside the recess 223 of the shroud 204. In this position, shown in FIG. 6, the bottom end 205e1 of the recess 205d1 presses the second member 233 of the lever 230 against the vertical tube 207a such that said second member 233 is vertical or substantially vertical and the first member 232 is horizontal or substantially horizontal. Thus, in the configuration illustrated in FIG. 6, wherein the rear frame 222 is connected to the front frame 221 and the U-shaped element 228 of said rear frame 222 abuts against the rubber reinforced screw head 229a, the projection 228k is received in the groove 232i provided in the first member 232, thus preventing the pivoting movement of the rear frame 221 relative to the front frame 222 and the upward movement of front frame 221 relative to the rear frame 222. This locking position of the lever 230 may advantageously be secured by securing means. In the embodiment shown, such securing means consists in a safety nib 235a integral with or fixedly connected to a flexible, vertically extending plate 235b, said plate being configured to slightly pivot around its lower end 235b1 so that said safety nib 235a can be moved between a securing position, as illustrated in FIGS. 6 and 6A, in which said safety nib 235a is received into an aperture 207a3, as shown in FIG. 4A, provided in the vertical tube 207a, thus preventing the upward movement of the battery box 205 relative to the shroud 204 and, accordingly, the detachment of said battery box 205 from said shroud 204, and a non-securing position, not shown, in which the plate 235b is inclined frontward relative to the vertical, the safety nib 235a being positioned outside the vertical tube 207a, thus permitting the upward movement of the battery box 205 relative to the shroud 204 and, accordingly, the detachment of said battery box 205 from said shroud 204.

The successive steps leading to the completely assembled configuration of the frame 202 from its completely disassembled configuration shown in FIG. 3 is illustrated in FIGS. 4, 4A, 5, 5A and 6, 6A.

With reference to FIGS. 4 and 4A, a first step of the assembling operation of the frame 202 is shown, wherein the rear frame 222 is pivotally coupled to the front frame 221 by positioning the crosspiece 224a of the rear frame 222 inside the hook 224b of the front frame 221. This step may advantageously be done by simultaneously rearward moving the front frame 221 so as to position the crosspiece 224a close to the rear end 221a of the front frame 221 and upward moving said rear end 221a so as to position the hook 224b over said crosspiece 224a. Thereafter, the rear end 221a is moved downward so as to position the crosspiece 224a inside the hook 224b. This step may advantageously be done by keeping the rear frame 222 fixed in a stable position. In said stable position, the castor wheels connected at the rear end of the rear frame 222 are in contact with the ground, the plane P1 substantially defined by the arms 225a, 225b being downward and rearward inclined relative to the horizontal and the plane P2 substantially defined by the U-shaped element 228 being downward and rearward inclined relative to the vertical, thus positioning the bottom member 228i in a longitudinally spaced-apart relation with regard to the rubber reinforced screw head 229a.

Figures 5, 5A:
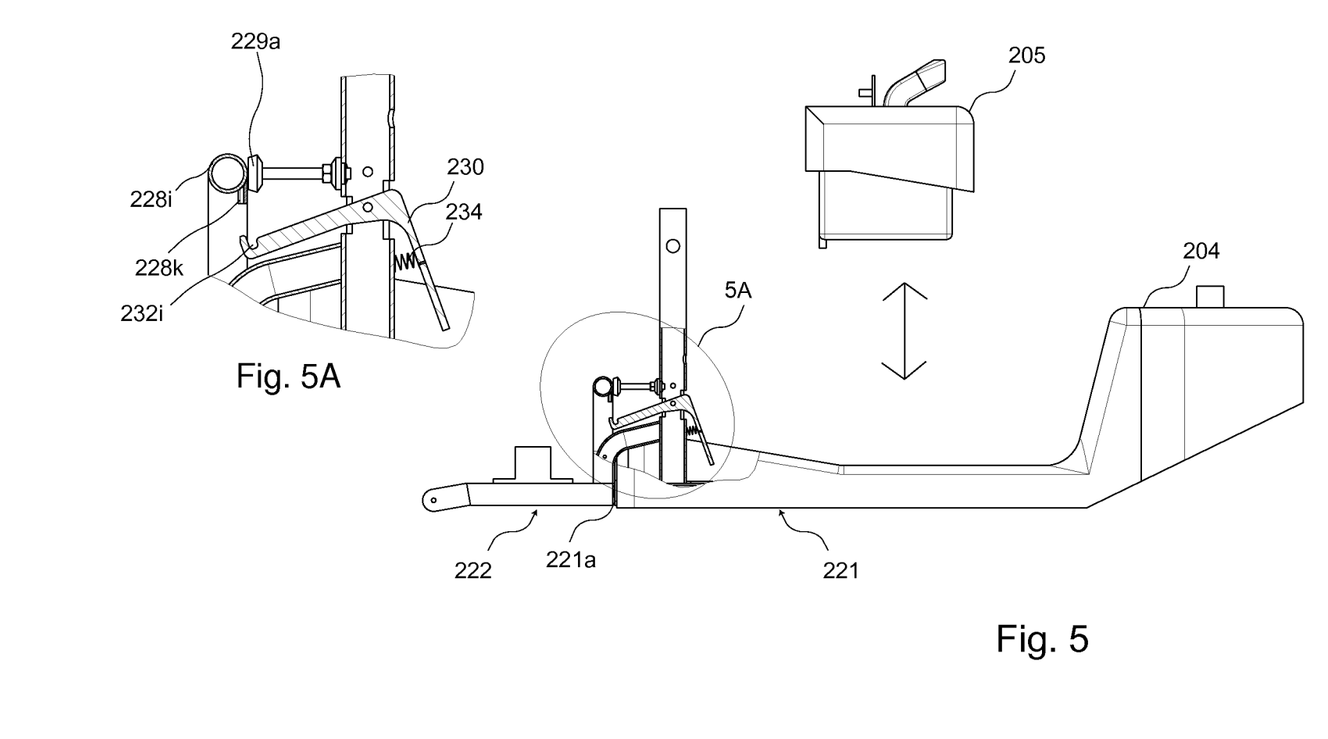
FIG. 5 is a view similar to FIG. 4, but in a second one of the partially assembled configurations of the two-part frame assembly.
FIG. 5A is an enlarged view of the area 5A of FIG. 5.

With reference to FIGS. 5 and 5A, a second step of the assembling operation of the frame 202 is shown, wherein the rear frame 222 is pivoted relative to the front frame 221 around the pivot axis XX' so as to position the bottom member 228i in contact with the rubber reinforced screw head 229a, the plane P1 being horizontal or substantially horizontal and the plane P2 being vertical or substantially vertical. This step may advantageously be done by moving the rear end 221a downward, thus exerting a downwardly effort on the crosspiece 224a through the hook 224b and, accordingly, forcing the rear frame 222 to pivot around the pivot axis XX' until the bottom member 228i abuts the rubber reinforced screw head 229a. This downward movement of the rear end 221a may advantageously occur under the effect of the weight of the front frame 221. Indeed, if the user does not hold the front frame 221, said front frame 221 tends to pivot in an anticlockwise direction around the front wheel axle under the effect of its weight, thus downwardly moving the rear end 221a relative to the rear frame 222. During this step, the lever 230 stays in its unlocking position, in particular under the action of the coil spring 234. Thus, as illustrated in FIG. 5A, the projection 228k is positioned in an upward spaced-apart relation with regard to the groove 232i.

With reference to FIGS. 6 and 6A, a final step of the assembling operation of the frame 202 is shown, wherein the lever 230 has pivoted in a clockwise direction around the pivot axis 231 so as to position the projection 228k inside the groove 232i, thus preventing the pivoting movement in the anticlockwise direction of the rear frame 222 around the pivot axis XX' and the upward movement of the front frame 221 relative to the rear frame 222. As explained in the above paragraphs, this step is done when the battery box 205 is mounted inside the recess 223 of the shroud 204. Thus, the user can easily and quickly know if the frame 202 is safely assembled by ensuring the correct positioning of the battery box 205 inside the recess 223.

It is clearly evident that the successive steps leading to the completely disassembled configuration of the frame 202 shown in FIG. 3 from its completely assembled configuration shown in FIG. 6 consist to invert the order of the three above detailed steps, the directions of the movements mentioned in the above paragraphs being of course inverted. These successive steps can be done by using only one hand. Indeed, the battery box 205 can be easily withdrawn from the recess 223 via its handle 205c and the first and second steps can be done by simply moving the front frame 221 via its vertical tube 207a.

It is also evident that the aim of the locking lever 230 is to define an abutment which abuts the rear frame 222, in particular the U-shaped element 228, when said locking lever is in its locking position, thus preventing said rear frame 222 from pivoting relative to the front frame 221. In this specific position, the rear frame 222, in particular the U-shaped element 228, is positioned over the locking lever 230, thus preventing the upward movement of the front frame 221 relative to the rear frame 222. When the locking lever is in its unlocking position, the rear frame 222, in particular the U-shaped element 228, can freely pivot around the pivot axis XX' and, thus, can be positioned so as to permit the upward movement of the front frame 221 relative to the rear frame 222, thus permitting the disassembling of the frame 202.

Figure 7:
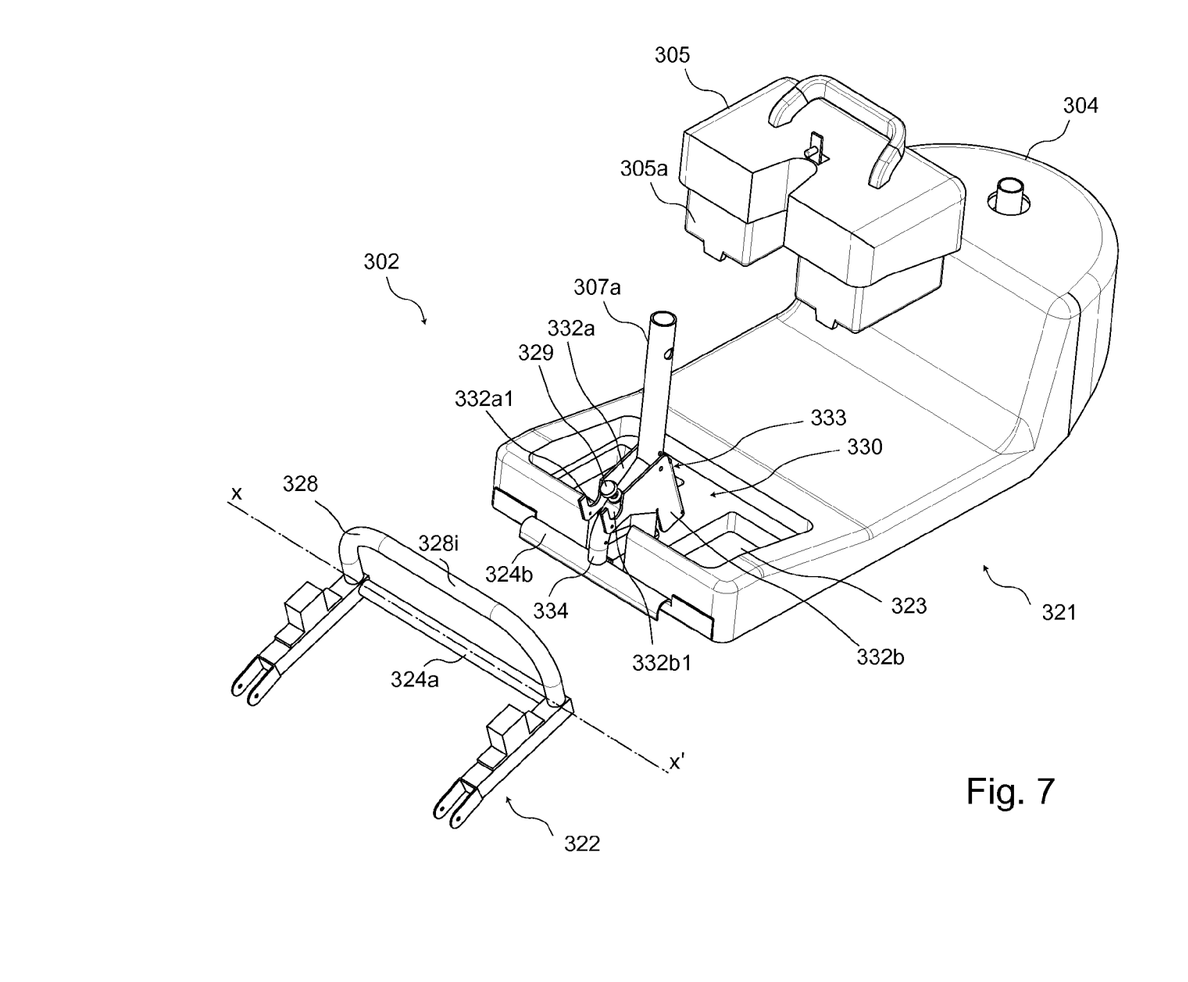
FIG. 7 is an exploded perspective view of the two-part frame assembly of a second embodiment of the vehicle according to the present invention in its disassembled configuration.

With reference to FIG. 7, a two-part frame 302 is illustrated that may advantageously replace the two-part frame 202 (FIG. 3) of the scooter 100 (FIG. 1) or in a scooter relatively similar thereto, thus leading to another embodiment of an exemplary power driven vehicle.

Figure 8:
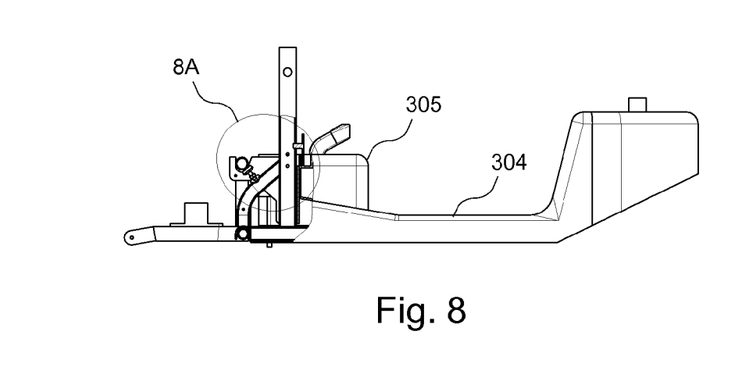
FIG. 8 is a side view of the two-part frame assembly of FIG. 7, but in a its completely assembled configuration, an area 8A being partially cross-sectioned.
Figure 8A:
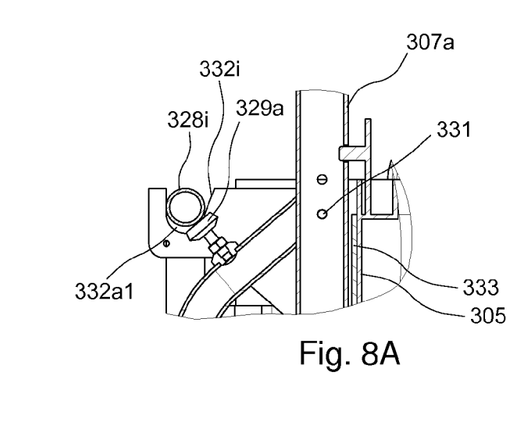
FIG. 8A is an enlarged view of the area 8A of FIG. 8.
Figure 8B:
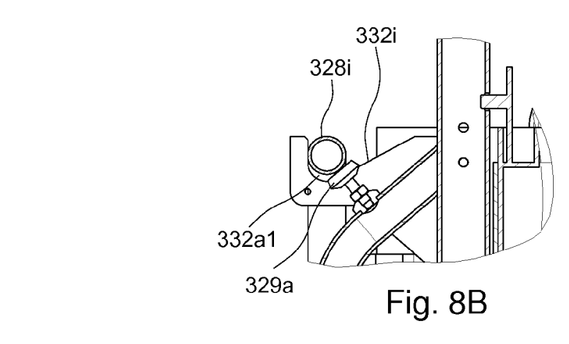
FIG. 8B is an enlarged view of the area A of FIG. 8, in a slightly modified version of the lever.

As illustrated in FIGS. 7, 8, and 8A, the locking lever 330 comprises two parallel L-shaped plates, a left plate 332a and a right plate 332b, extending in a longitudinal direction at left and right sides of the vertical tube 307a and of the crossbar 334. The plates 332a, 332b are linked together at their front ends by a lateral plate 333 integral therewith, said plate 333 extending forward to the vertical tube 307a and being upwardly inclined from the vertical in the unlocking position of the lever 330 illustrated in FIG. 7. Each plate 332a, 332b is pivotally connected to the vertical tube 307a around a pivoting axis 331 and is provided with recesses 332a1, 332b1 at their upper sides, said recesses 332a1, 332b1 being adapted to at least partially receive the bottom member 328i of the U-shaped element 328 when the front frame 321 and the rear frame 322 are pivotally connected together, the U-shaped element 328 abutting the rubber reinforced screw head 329a of the screw 329, and when the plate 333 is vertical or substantially vertical and the upper sides of the plates 332a, 332b are horizontal or substantially horizontal, thereby preventing the pivoting and upward movement of the front frame 321 relative to the rear frame 322. This specific configuration is illustrated in FIGS. 8, 8A and corresponds to the locking position of the lever 330 and to the completely assembled configuration of the frame 302. In the embodiment shown, the recesses 332a1, 332a2 are also specifically designed so as to define an abutment surface 332i against which may abut the U-shaped element 328 when the rear frame 322 is pivoted in the clockwise direction relative to the front frame 321 and when the screw 329 is withdrawn. Therefore, the recesses 332a1, 332a2 may advantageously replace the rubber reinforced screw head 329a as a stop means for the U-shaped element 328 if the abutment surface 332i is suitably designed. By comparison, one can see in the embodiment shown in FIG. 8B that the abutment surface 332i may also be configured so as to not define a stop means for the U-shaped element 328. In this case, the rubber reinforced screw head 329a or some other stopping means is needed.

The lever 330 may advantageously be configured so as to automatically move from its locking position to its unlocking position under the effect of its weight. In particular, the position of the pivot axis 331 may be suitably chosen so as to be forwardly spaced-apart from the center of mass of the lever 330. In addition to or in substitution to the above mentioned advantageous configuration, the lever 330 may also move from its locking position to its unlocking position under the action of a resilient means (not shown).

The lever 330 moves from its unlocking position to its locking position when the battery box 305, corresponding substantially to the battery box 205, is mounted inside the recess 323, corresponding substantially to the recess 223, provided in the shroud 304. Indeed, as shown in FIGS. 8 and 8A, when the battery box 305 is mounted inside the recess 323, the battery box 305 presses the plate 333 of the lever 330 against the vertical tube 307a such that the lever 330 pivots in a clockwise direction around the pivot axis 331 till it abuts the bottom member 328i of the U-shaped element 328. In this locking position of the lever, the plate 333 is vertical or substantially vertical, the upper sides of the plates 332a, 332b are horizontal or substantially horizontal and the bottom member 328i of the U-shaped element 328 is at least partially received inside the recesses 332a1 and 332b1. Thus, when one tries to pivot the rear frame 322 around the pivot axis XX' defined by the tubular crosspiece 324a, corresponding substantially to the tubular crosspiece 224a, the bottom member 328i abuts the lever 330 and when one tries to upwardly move the front frame 321 relative to the rear frame 322, the lever 330 abuts the bottom member 328i.

The above detailed description with reference to the drawings illustrates rather than limit the invention. There are numerous alternatives, which fall within the scope of the appended claims. For example, one could modify the shape of the locking lever and/or the specific positions of the locking lever in its locking and unlocking positions.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

What is claimed is:

1. A power driven vehicle used by at least partially disabled persons for mobility, the vehicle comprising:
    a frame having a front frame and a rear frame that are detachably and pivotally connected together, said front frame comprising means for receiving at least one steerable wheel and a steering mechanism and means for receiving a seat, and said rear frame comprising means for receiving at least two drive wheels,
    the at least one steerable wheel, the steering mechanism and the seat connected to said front frame,
    the at least two drive wheels pivotally connected to said rear frame via a single axle,
    an electric motor mounted on said rear frame and adapted to drive at least one of said at least two drive wheels,
    a shroud covering at least partially said front frame and fixedly connected thereto,
    at least one battery box detachably mounted on said shroud and in electrical communication with said electric motor,
    locking and unlocking means adapted to prevent, or conversely permit, a disconnection of said rear frame from said front frame, wherein said locking and unlocking means comprises a locking lever pivotally connected to said front frame moveable between a locking position, in which at least one groove or one recess provided in said lever defines an abutment against which abuts said rear frame when the vehicle is in a normal position of use, thus preventing said rear frame from pivoting relative to said front frame, and an unlocking position, in which said rear frame can pivot relative to said front frame, thus permitting the disconnection of said rear frame from said front frame, and wherein said locking lever is configured so as to move from the locking position to the unlocking position when said battery box is detached from said shroud.

2. The power driven vehicle of claim 1, wherein the pivot axis around which pivots the locking lever is positioned such that the locking lever automatically moves from the locking position to the unlocking position under an effect of weight.

3. The power driven vehicle of claim 1, wherein the battery box is provided with a handle so as to facilitate the detachment of said battery box from the shroud and the handling of said battery box.

4. The power driven vehicle of claim 1, further comprising resilient means, wherein the locking lever moves from the locking position to the unlocking position under the action of said resilient means.

5. The power driven vehicle of claim 4, wherein said resilient means comprise at least one coil spring connected at one end to the locking lever and at another end to a vertical tube of the front frame, the locking lever being pivotally connected thereto.

6. The power driven vehicle of claim 1, wherein the locking lever defines an L-shaped element comprising at least one first member and one second member perpendicular or substantially perpendicular thereto, said first member being configured so as to be horizontal or substantially horizontal when the locking lever is in the locking position and inclined downwards relative to the horizontal when the locking lever is in the unlocking position.

7. The power driven vehicle of claim 6, wherein the battery box is configured so as to maintain the at least one second member of the locking lever in a vertical or substantially vertical orientation when the battery box is mounted on the shroud, thus maintaining the locking lever in the locking position.

8. The power driven vehicle of claim 1, wherein the shroud is provided with at least one recess inside which is at least partially received the battery box so that said battery box can be easily mounted on said shroud, said recess being positioned in a rear section of said shroud that is close to the rear frame when the vehicle is in the normal position of use.

9. The power driven vehicle of claim 8, wherein the shroud further includes a middle section adjacent to the rear section, said middle section being adapted to support a user's feet.

10. The power driven vehicle of claim 1, wherein the rear frame comprises two laterally spaced-apart, longitudinally extending arms joined together at their front end by at least one laterally extending tubular crosspiece defining a pivot axis, said crosspiece being adapted to be received into at least one hemi-cylindrical or substantially hemi-cylindrical hook provided at a rear end of the front frame, said hook being configured so as to permit the pivoting movement of the front frame relative to the rear frame around said pivot axis and the upward movement of the front frame relative to the rear frame when the locking lever is in the unlocking position.

11. The power driven vehicle of claim 10, wherein each arm is provided with a drive wheel axle supporting member adapted to pivotally connect the axle of the drive wheels and with a castor wheel axle supporting member adapted to pivotally connect an axle of a castor wheel, said castor wheel being spaced upwardly from the ground in the normal position of use of the vehicle and being adapted to be in contact with the ground when the rear frame is disconnected from the front frame, thus limiting backward rocking of said rear frame.

12. The power driven vehicle of claim 10, wherein the rear frame further comprises one U-shaped element comprising a bottom member connected to the two arms via two lateral members, said U-shaped element being disposed over the at least one tubular crosspiece and substantially defining a first plane orthogonal or substantially orthogonal to a second plane substantially defined by said two arms, said U-shaped element being configured so as to be received inside at least one recess provided in the locking lever when the vehicle is in the normal position of use.

13. The power driven vehicle of claim 12, wherein the front frame is provided with stop means against which abuts the U-shaped element when the rear frame and the front frame have a same relative position as in the normal position of use of the vehicle, thus permitting an easier positioning of the locking lever in the locking position.

14. The power driven vehicle of claim 13, wherein said stop means comprises a rubber reinforced screw head of a screw, the screw being fixedly connected to a vertical tube of the front frame, the locking lever being pivotally connected thereto.

15. The power driven vehicle of claim 13, wherein said stop means comprises a rubber reinforced screw head of a screw, the screw being fixedly connected to a curve-shaped crossbar of the front frame, said crossbar extending upwardly and forwardly from the hook to a vertical tube of the front frame, the locking lever being pivotally thereto.

16. The power driven vehicle of claim 13, wherein said stop means comprises an abutment surface of the locking lever.

17. The power driven vehicle of claim 10, wherein the rear frame further comprises one U-shaped element comprising a bottom member connected to the two arms via two lateral members, said U-shaped element being disposed over the at least one tubular crosspiece and substantially defining a first plane orthogonal or substantially orthogonal to a second plane substantially defined by said two arms, wherein said bottom member is provided with a downward extending projection, said projection being configured so as to be received inside a groove provided in the locking lever when the vehicle is in the normal position of use.

18. The power driven vehicle of claim 17, wherein the front frame is provided with stop means against which abuts the U-shaped element when the rear frame and the front frame have a same relative position as in the normal position of use of the vehicle, thus permitting an easier positioning of the locking lever in the locking position.

19. The power driven vehicle of claim 18, wherein said stop means comprises a rubber reinforced screw head of a screw, the screw being fixedly connected to a vertical tube of the front frame, the locking lever being pivotally connected thereto.

20. The power driven vehicle of claim 18, wherein said stop means comprises a rubber reinforced screw head of a screw, the screw being fixedly connected to a curve-shaped crossbar of the front frame, said crossbar extending upwardly and forwardly from the hook to a vertical tube of the front frame, the locking lever being pivotally connected thereto.

21. The power driven vehicle of claim 18, wherein said stop means comprises an abutment surface provided in the locking lever.

* * * * *

UNITED STATES PATENT AND TRADEMARK OFFICE
CERTIFICATE OF CORRECTION

PATENT NO.       : 9,561,143 B2
APPLICATION NO.  : 14/717006
DATED            : February 7, 2017
INVENTOR(S)      : Dirk Hoffmann Page 1 of 1

It is certified that error appears in the above-identified patent and that said Letters Patent is hereby corrected as shown below:

In the Specification

Column 1, Line 39: "...in some other mariner..." to be replaced with "...in some other manner..."

Signed and Sealed this
Sixth Day of June, 2017

Michelle K. Lee
*Director of the United States Patent and Trademark Office*